United States Patent
Ikezawa et al.

(10) Patent No.: US 11,619,839 B2
(45) Date of Patent: Apr. 4, 2023

(54) METHOD FOR MANUFACTURING LAMINATED GLASS, LAMINATED GLASS AND LIGHT CONTROL FILM

(71) Applicant: DAI NIPPON PRINTING CO., LTD., Tokyo (JP)

(72) Inventors: Takao Ikezawa, Tokyo (JP); Keisuke Miura, Tokyo (JP); Norio Ishii, Tokyo (JP); Makoto Yamaki, Tokyo (JP); Yusuke Nakamura, Tokyo (JP); Tomoya Kawashima, Tokyo (JP); Yusuke Hagiwara, Tokyo (JP); Satoru Nishima, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 127 days.

(21) Appl. No.: 16/761,316

(22) PCT Filed: Nov. 2, 2018

(86) PCT No.: PCT/JP2018/040883
§ 371 (c)(1),
(2) Date: Jul. 27, 2020

(87) PCT Pub. No.: WO2019/088261
PCT Pub. Date: May 9, 2019

(65) Prior Publication Data
US 2021/0208445 A1 Jul. 8, 2021

(30) Foreign Application Priority Data

Nov. 2, 2017 (JP) .............................. JP2017-213295
Nov. 24, 2017 (JP) .............................. JP2017-225787

(51) Int. Cl.
*G02F 1/1333* (2006.01)
*B32B 17/10* (2006.01)
(Continued)

(52) U.S. Cl.
CPC .. *G02F 1/133302* (2021.01); *B32B 17/10036* (2013.01); *B32B 17/10504* (2013.01);
(Continued)

(58) Field of Classification Search
None
See application file for complete search history.

(56) References Cited

U.S. PATENT DOCUMENTS

2005/0190331 A1* 9/2005 Yano .................... G02F 1/13452
349/142
2005/0190332 A1* 9/2005 Yano ................. B32B 17/10036
349/149
(Continued)

FOREIGN PATENT DOCUMENTS

CN 1701265 A 11/2005
CN 1701266 A 11/2005
(Continued)

OTHER PUBLICATIONS

Jan. 8, 2019 International Search Report issued in International Patent Application No. PCT/JP2018/040883.
(Continued)

*Primary Examiner* — Ryan Crockett
(74) *Attorney, Agent, or Firm* — Oliff PLC

(57) ABSTRACT

A method for manufacturing a laminated glass whereby, in a laminated glass comprising a liquid crystal film sandwiched therein and having a three-dimensionally curved surface shape, the formation of wrinkles in the liquid crystal film can be suppressed; and a laminated glass which has a three-dimensionally curved surface shape and in which wrinkles in a liquid crystal film sandwiched therein are suppressed. The method for manufacturing the laminated glass comprises: a heat molding step for heating the liquid crystal film to a temperature higher than the glass transition point of the first base material layer and the second base material layer; and a bonding step for, after completing the heat molding step, heating the laminate, wherein the liquid crystal film is sandwiched between the first glass sheet and the second glass sheet, at a temperature lower than the glass transition point and bonding the same by applying a preset pressure.

5 Claims, 8 Drawing Sheets

(51) Int. Cl.
    *B32B 37/06* (2006.01)
    *G02F 1/1343* (2006.01)
(52) U.S. Cl.
    CPC .. *B32B 17/10752* (2013.01); *B32B 17/10871*
        (2013.01); *B32B 37/06* (2013.01); *G02F*
        *1/13439* (2013.01); *B32B 2457/202* (2013.01)

(56) References Cited

U.S. PATENT DOCUMENTS

2007/0058114 A1* 3/2007 Niiyama ................ G02F 1/13
                                              349/106
2008/0278642 A1  11/2008 Miura et al.
2018/0307077 A1* 10/2018 Miura ................ G02F 1/13725
2019/0121186 A1*  4/2019 Miura ................ G02F 1/13394

FOREIGN PATENT DOCUMENTS

| CN | 107272105 A | 10/2017 |
|---|---|---|
| JP | H02-132417 A | 5/1990 |
| JP | H09-258176 A | 10/1997 |
| JP | 2006-126371 A | 5/2006 |
| JP | 2007-102210 A | 4/2007 |
| JP | 2008-175914 A | 7/2008 |
| JP | 2016-164617 A | 9/2016 |
| JP | 2017-97339 A | 6/2017 |
| JP | 2017-187685 A | 10/2017 |
| JP | 2017-194600 A | 10/2017 |
| JP | 2018-105919 A | 7/2018 |
| WO | 2017/082403 A1 | 5/2017 |
| WO | 2017/183692 A1 | 10/2017 |

OTHER PUBLICATIONS

Jan. 19, 2022 Office Action issued in Chinese Patent Application No. 201880068773.X.
Jan. 28, 2022 Extended Search Report issued in European Patent Application No. 18874232.4.

* cited by examiner

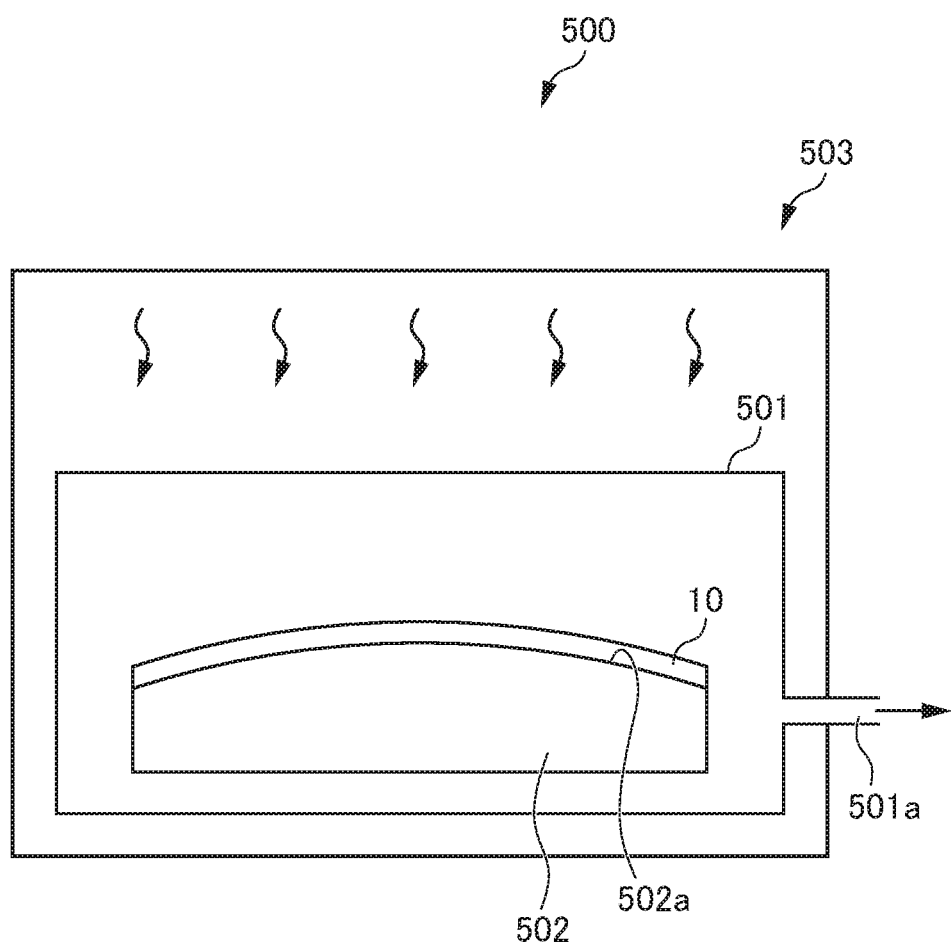

METHOD FOR MANUFACTURING LAMINATED GLASS, LAMINATED GLASS AND LIGHT CONTROL FILM

TECHNICAL FIELD

Embodiments of the present disclosure relate to a method for manufacturing laminated glass having a three-dimensional curved surface shape, laminated glass having a three-dimensional curved surface shape, and a light control film.

BACKGROUND ART

Conventionally, there are suggested light control films usable in an electronic blind that is attached to light-transmitting member such as a window to control transmission of external light. One of the light control films uses liquid crystal. The light control film that uses liquid crystal is prepared by sandwiching a liquid crystal film in which a liquid crystal material is sandwiched by transparent plate materials including transparent electrodes with linear polarization plates. The light control film controls a transmission amount of external light by changing an electric field applied to between transparent electrodes that cause change of an alignment of the liquid crystal.

It has been proposed to manufacture a laminated glass by sandwiching the liquid crystal film with glasses (for example, refer to Patent Document 3). However, conventionally, a laminated glass sandwiching a liquid crystal film has not been actually manufactured. Accordingly, a laminated glass sandwiching a liquid crystal film could not be properly manufactured by simply applying the same method for manufacturing conventional laminated glass having a configuration in which an interlayer is simply interposed. Particularly, in a case where a surface shape of a laminated glass is a three-dimensional curved surface, since a planar liquid crystal film is sandwiched between glass plates having a three-dimensional curved surface shape, there is a problem that wrinkles occur in a part of the liquid crystal film. In a laminated glass having the three-dimensional curved surface shape, wrinkles tend to occur in cases where a curvature of the three-dimensional curved surface is large or where the size of the laminated glass is large. In addition, in the interlayer that is laminated inside the laminated glass, air bubbles considered to be caused by the wrinkles may occur, and voids may occur at a part of the laminated glass.

Patent Document 1: Japanese Unexamined Patent Application, Publication No. 2016-164617

SUMMARY OF INVENTION

Problems to be Solved by the Invention

An object of embodiments of the present disclosure is to provide a method for manufacturing laminated glass having a three-dimensional curved surface shape in which wrinkles and voids are reduced, laminated glass, and a light control film.

Means for Solving the Problems

Embodiments of the present disclosure accomplish the above-described object by the following solving means. Note that, for easy understanding, description will be made with reference to reference numerals corresponding to the embodiment of the present disclosure, but the embodiments of the present disclosure is not limited to the description.

A first aspect of the present disclosure is a method for manufacturing a laminated glass (1) obtained by joining a laminated body in which a liquid crystal film (10) is sandwiched with a first glass plate (33A) which has a three-dimensional curved surface shape and a second glass plate (33B) which has a three-dimensional curved surface shape. The liquid crystal film includes a first base material layer (21A), a first transparent electrode layer (22A), a liquid crystal layer (14), a second transparent electrode layer (22B), and a second base material layer (21B) in this order in a thickness direction. The method includes a thermoforming process (S10) of heating the liquid crystal film to a temperature equal to or higher than a glass transition point of the first base material layer and the second base material layer to form the liquid crystal film into the three-dimensional curved surface shape of the laminated glasses; and a joining process (S30, S40) to join the laminated body in which the liquid crystal film is sandwiched with the first glass plate and the second glass plate by heating the laminated body at a temperature lower than a glass transition point of the first base material layer and the second base material layer after performing the thermoforming process, and pressing the laminated body at a predetermined pressure.

A second aspect of the present disclosure is the method for manufacturing laminated glass according to the first aspect of the present disclosure, wherein in a case where an arbitrary rectangle (200) that is inscribed in an external shape (100) of the laminated glass in plan view at three or more points is set, and a greater one between a variation amount of a first dimension (s1) in the rectangle along a surface shape of the laminated glass in a direction parallel to one side (201) of the rectangle in plan view and a variation amount of a second dimension (s2) in the rectangle along the surface shape of the laminated glass in a direction parallel to another side (202) of the rectangle in plan view is set as a curvature evaluation value (S) of the rectangle, in the laminated glass, one or more pieces of the rectangles of which the curvature evaluation value is 0.0003 mm or greater can be set.

A third aspect of the present disclosure is the method for manufacturing laminated glass according to the first aspect of the present disclosure, wherein, in the thermoforming process (S10), the liquid crystal film (10) is heated to a temperature equal to or higher than the glass transition point of the first base material layer (21A) and the second base material layer (21B), and then is cooled down to a temperature lower than the glass transition point in a state in which the liquid crystal film is pressed to come into close contact with a forming die (302, 401, 402, 502).

A fourth aspect of the present disclosure is the method for manufacturing laminated glass according to the first aspect of the present disclosure, wherein the glass transition point of the first base material layer and the second base material layer is 100° C. or higher.

A fifth aspect of the present disclosure is the method for manufacturing laminated glass according to the first aspect of the present disclosure, wherein the glass transition point of the first base material layer and the second base material layer is 130° C. or higher.

A sixth aspect of the present disclosure is a laminated glass obtained by joining a laminated body in which a liquid crystal film (10) is sandwiched with a first glass plate (33A) which has a three-dimensional curved surface shape and a second glass plate (33B) which has a three-dimensional curved surface shape. The liquid crystal film includes a first base material layer (21A), a first transparent electrode layer (22A), a liquid crystal layer (14), a second transparent electrode layer (22B), and a second base material layer (21B) in this order in a thickness direction. In a case where an arbitrary rectangle that is inscribed in an external shape of the laminated glass in plan view at three or more points is set, and a greater one between a variation amount of a first dimension in the rectangle along a surface shape of the laminated glass in a direction parallel to one side of the rectangle in plan view and a variation amount of a second dimension in the rectangle along the surface shape of the laminated glass in a direction parallel to another side of the rectangle in plan view is set as a curvature evaluation value of the rectangle, in the laminated glass, the curvature evaluation value of the rectangle is less than 0.0003 mm.

A seventh aspect of the present disclosure is a laminated glass (1) in which a first glass plate (33A), a first interlayer (31A), a liquid crystal film (10), a second interlayer (31B), and a second glass plate (33B) are laminated and disposed in this order. The liquid crystal film (10) includes a first base material layer (21A), a first transparent electrode layer (22A) that is formed on the first base material layer (21A), a second base material layer (21B), a second transparent electrode layer (22B) that is formed on the second base material layer (21B) and is disposed to be opposed to the first transparent electrode layer (22A), and a liquid crystal material (14) that is disposed between the first transparent electrode layer (22A) and the second transparent electrode layer (22B) and causes a transmittance to vary in correspondence with a potential difference between the first transparent electrode layer (22A) and the second transparent electrode layer (22B). A glass transition point of the first base material layer (21A) and the second base material layer (21B) is 100° C. or higher, and a plate surface of the laminated glass (1) has a three-dimensional curved surface shape.

An eighth aspect of the present disclosure is the laminated glass (1) according to the seventh aspect of the present disclosure, wherein the glass transition point of the first base material layer (21A) and the second base material layer (21B) is 130° C. or higher.

A ninth aspect of the present disclosure is the laminated glass (1) according to the seventh aspect of the present disclosure, wherein the first base material layer (21A) and the second base material layer (21B) are formed from any one of a polycarbonate resin, and a cycloolefin polymer resin, and have a thickness of 100 μm or less.

A tenth aspect of the present disclosure is the laminated glass (1) according to the seventh aspect of the present disclosure, wherein the first base material layer (21A) and the second base material layer (21B) are formed from a non-stretched material.

An eleventh aspect of the present disclosure is the laminated glass (1) according to the seventh aspect of the present disclosure, wherein the first base material layer (21A) and the second base material layer (21B) are formed from a material of which Young's modulus is 4.3 GPa or less.

A twelfth aspect of the present disclosure is the laminated glass (1) according to the seventh aspect of the present disclosure, wherein a plate surface of the laminated glass (1) has a radius of curvature of 2000 mm or less.

A thirteenth aspect of the present disclosure is a light control film (10) in a laminated body (30) in which a first glass plate (33A), a first interlayer (31A), the liquid crystal film (10), a second interlayer (31B), and a second glass plate (33B) are laminated and disposed in this order. The liquid crystal film (10) includes a first base material layer (21A); a first transparent electrode layer (22A) that is formed on the first base material layer (21A); a second base material layer (21B); a second transparent electrode layer (22B) that is formed on the second base material layer (21B) and is disposed to be opposed to the first transparent electrode layer (22A); and a liquid crystal material (14) that is disposed between the first transparent electrode layer (22A) and the second transparent electrode layer (22B) and causes a transmittance to vary in correspondence with a potential difference between the first transparent electrode layer (22A) and the second transparent electrode layer (22B). A glass transition point of the first base material layer (21A) and the second base material layer (21B) is 100° C. or higher.

A fourteenth aspect of the present disclosure is the light control film (10) according to the thirteenth aspect of the present disclosure, wherein the glass transition point of the first base material layer (21A) and the second base material layer (21B) is 130° C. or higher.

Effects of the Invention

According to the embodiment of the present disclosure, it is possible to provide a method for manufacturing laminated glass having a three-dimensional curved surface shape in which wrinkles and voids are reduced, laminated glass, and a light control film.

BRIEF DESCRIPTION OF THE DRAWINGS

FIG. 4 is a view illustrating a flow of processes of manufacturing the laminated glass 1 of this embodiment by a perspective view or the like.

FIG. 8 is a view describing a case where the light control film 10 is thermoformed by a bag method using a bag device 500.

PREFERRED MODE FOR CARRYING OUT THE INVENTION

Figure 1:
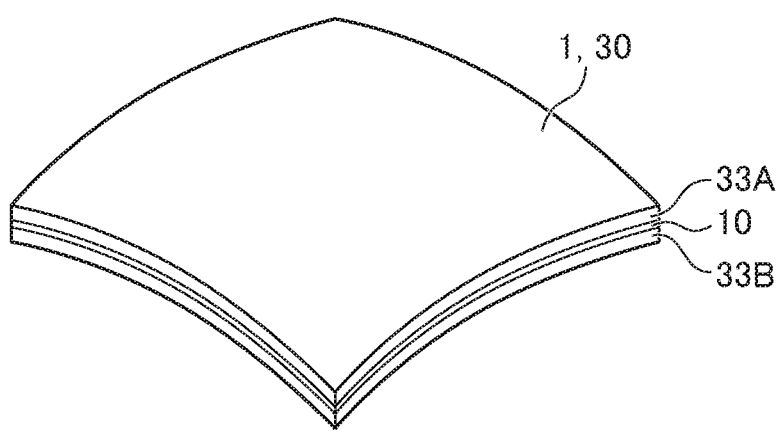
FIG. 1 is a view illustrating laminated glass 1 of this embodiment.

Hereinafter, embodiments of the present disclosure will be described with reference to the accompanying drawings. Note that, the following respective drawings including FIG. 1 are schematic views, and sizes and shapes of respective portions are appropriately exaggerated for easy understanding. In addition, in the following description, specific numerical values, shapes, materials, and the like are described for explanation, but these can be appropriately changed. In this specification, it is assumed that terms which specify shapes and geometric conditions, for example, terms such as parallel and orthogonal, include a state having a similar optical function and having an error that can be regarded as parallel and orthogonal in addition to strict meaning thereof.

In this specification, words such as a plate, a sheet, and a film are used, but generally the plate, the sheet, and the film are used in the order of larger thickness, and in this specification, the words are used in accordance with the order of thickness. However, the words may be appropriately substituted with each other since such usage does not have technical significance.

In embodiments of the present disclosure, "transparent" represents that at least usable wavelength light is transmitted. For example, even in a member through which visible light is not transmitted, if infrared rays are transmitted through the member and the member is usable for infrared rays, the member should be treated as transparent. Note that, specific numerical values defined in this specification and appended claims should be treated to include a typical error range. That is, it should be understood that a difference by approximately ±10% is not a substantial difference, and numerical values that are slightly outside a numerical value range defined in the specification and claims should be interpreted to be substantially within the defined range.

Embodiment

FIG. 1 illustrates a laminated glass 1 of this embodiment. The laminated glass 1 of this embodiment has a surface shape constituted by a three-dimensional curved surface. Here, the three-dimensional curved surface is not a simple cylindrical surface, but it is a curved surface that cannot be constituted only by deforming a plane without expansion and contraction, and is a curved surface defined by two independent parameters in a three-dimensional space. For example, a curved surface, which has two curvature criteria including a radius of curvature Rx and a radius of curvature Ry respectively around an X-axis and a Y-axis orthogonal to each other set as central axes as parameters, can be mentioned.

In description of this embodiment, a member in which respective constituent members of the laminated glass 1 are laminated and disposed is referred to as a laminated body 30. The laminated body 30 represents a state before the respective members of the laminated glass 1 are joined, and thus the configuration is the same as in the laminated glass 1. In the laminated body 30 of this embodiment, a first glass plate 33A, a first interlayer forming sheet 31A, a light control film (liquid crystal film) 10, a second interlayer forming sheet 31B, and a second glass plate 33B are laminated and disposed in this order. Note that, in FIG. 1, the first interlayer forming sheet 31A and the second interlayer forming sheet 31B are not illustrated.

(Basic Configuration of Light Control Film)

Figure 2:
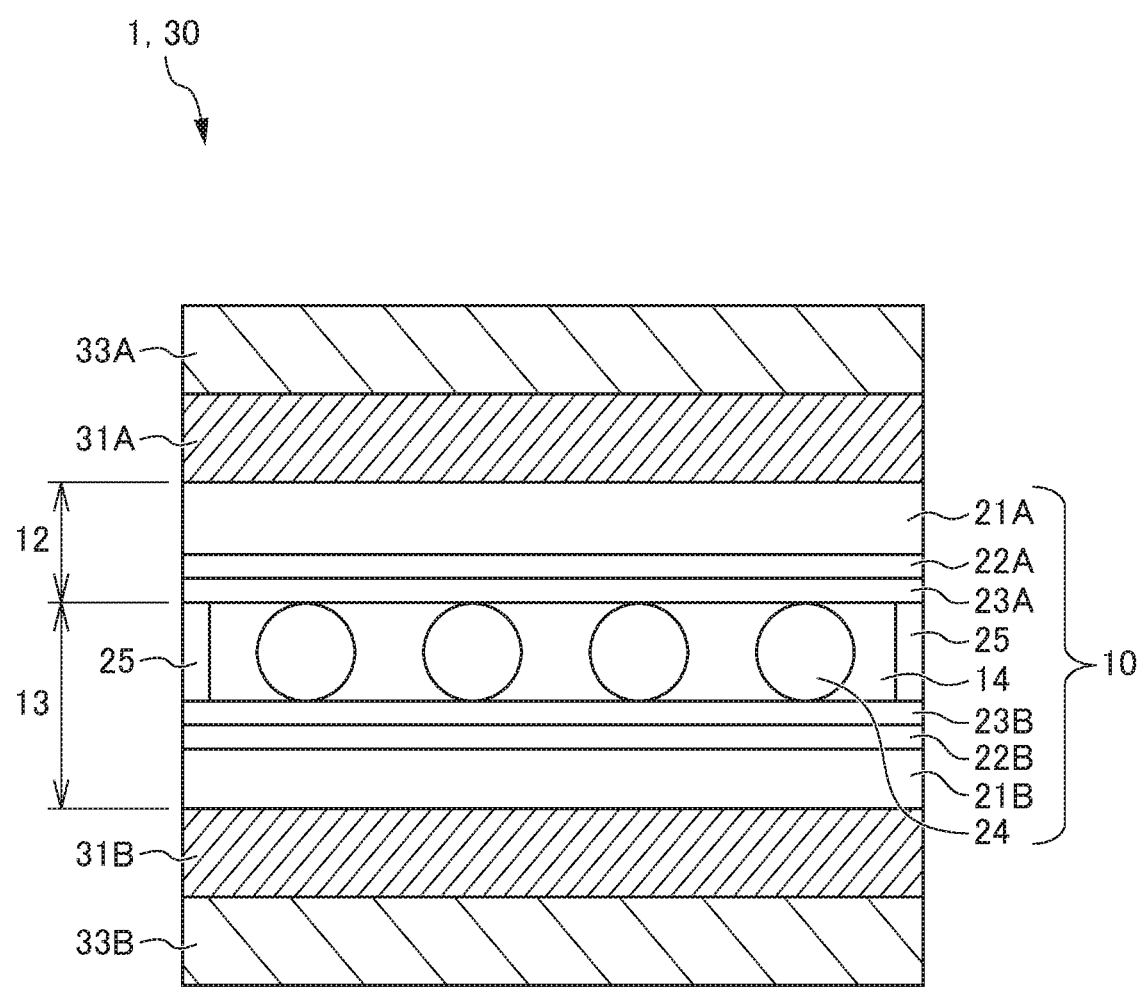
FIG. 2 is a sectional view illustrating a layer configuration of the laminated glass 1 of this embodiment mainly illustrating a light control film 10.

FIG. 2 is a sectional view illustrating a layer configuration of the laminated glass 1 of this embodiment mainly illustrating the light control film 10. Note that, the laminated glass 1 of this embodiment has a three-dimensional curved surface shape, but in FIG. 2, for easy understanding, a sectional view in a case where the surface shape is a planar shape is illustrated. The light control film 10 (liquid crystal film) is a film capable of controlling the amount of transmitting light by changing an application voltage. The light control film 10 of this embodiment is utilized, for example, in a state of being sandwiched between glass plates (transparent members) in combination with an intermediate material of the laminated glass 1 or instead of the intermediate material. The laminated glass 1 including the light control film 10 is disposed at, for example, a portion subjected to light control such as a window glass of a building, a showcase, an indoor transparent partition, a window of a vehicle (a place to which external light is incident, for example, a front window, a side window, a rear window, or a roof window) and can control the amount of light incident to the inside of the building, the vehicle, or the like.

The light control film 10 (liquid crystal film) is a member that includes a guest-host type liquid crystal layer using a dichroic dye, and changes the amount of transmitting light by an electric field that is applied to the liquid crystal. The light control film 10 has a configuration in which a liquid crystal layer 14 is sandwiched between a first laminated body 12 as a first film-shaped laminated body and a second laminated body 13 as a second film-shaped laminated body. The first laminated body 12 is formed by laminating a first transparent electrode layer 22A and a first alignment layer 23A on a first base material layer 21A. The second laminated body 13 is formed by laminating a second transparent electrode layer 22B, a second alignment layer 23B, and a bead spacer 24 on a second base material layer 21B. The light control film 10 changes the amount of transmitting light by changing an alignment of a liquid crystal material of a guest-host liquid crystal composition provided in the liquid crystal layer 14 through an operation of the first transparent electrode layer 22A which is provided in the first laminated body 12 and the second transparent electrode layer 22B which is provided in the second laminated body 13.

The first base material layer 21A and the second base material layer 21B are formed from a transparent resin, and a flexible film is applicable thereto. As the first base material layer 21A and the second base material layer 21B, it is preferable to apply a transparent resin film in which optical anisotropy is small and a transmittance at a wavelength in a visible region (380 to 800 nm) is 80% or greater. Examples of material of the transparent resin film include acetylcellulose-based resins such as triacetylcellulose (TAC), polyester-based resins such as polyethylene terephthalate (PET) and polyethylene naphthalate (PEN), polyolefin-based resins such as polyethylene (PE), polypropylene (PP), polystyrene, polymethylpentene, and EVA, vinyl-based resins such as polyvinyl chloride and polyvinylidene chloride, acrylic resins, polyurethane-based resins, and resins such as polysulfone (PEF), polyethersulfone (PES), polycarbonate (PC), polysulfone, polyether (PE), polyetherketone (PEK), (meth) acrylonitrile, cycloolefin polymer (COP), and cycloolefin copolymer. As a material of the transparent resin film, particularly, resins such as polycarbonate, cycloolefin polymer, polyethylene terephthalate are preferable. Since the light control film 10 of this embodiment is formed in a three-dimensional curved surface, as the material of the transparent resin film used as the first base material layer 21A and the second base material layer 21B, it is more preferable to use any one among a polycarbonate (PC) resin, a polyethylene terephthalate (PET) resin, and a cycloolefin polymer (COP) resin. The thickness of the transparent resin film of the first base material layer 21A and the second base material layer 21B depends on a material thereof, and it can be appropriately selected in a range in which the transparent resin film has flexibility, but it is preferable that the thickness is 100 μm or less. In this embodiment, a polycarbonate film having a thickness of 100 μm is applied to the first base material layer 21A and the second base material layer 21B.

The first transparent electrode layer 22A and the second transparent electrode layer 22B are constituted by transparent conductive layers which are respectively laminated on the first base material layer 21A and the second base material layer 21B (the transparent resin film). As the transparent conductive layers, various transparent electrode materials applied to this kind of transparent resin film can be applied, and examples thereof include an oxide-based transparent metal thin film having a total light transmittance of 50% or greater. A tin oxide-based material, an indium oxide-based material, and a zinc oxide-based material can be exemplified.

Examples of the tin oxide (SnO2)-based material include Nesa (tin oxide: SnO2), an antimony tin oxide (ATO: antimony-doped tin oxide), a fluorine-doped tin oxide. Examples of the indium oxide (In2O3)-based material include an indium oxide, an indium tin oxide (ITO), and an indium zinc oxide (IZO). Examples of the zinc oxide (ZnO)-based material include a zinc oxide, an aluminum-doped zinc oxide (AZO), and gallium-doped zinc oxide. In this embodiment, the transparent conductive layer that constitutes the first transparent electrode layer 22A and the second transparent electrode layer 22B is formed from the ITO.

In this embodiment, as a spacer, the bead spacer 24 having a spherical shape is utilized. The bead spacer 24 is provided to define a thickness (cell gap) of a portion in the liquid crystal layer 14 excluding an outer peripheral portion thereof A configuration of an inorganic material by silica or the like, a configuration by an organic material, a configuration of a core shell structure in combination of the configurations, and the like are widely applicable to the bead spacer 24. In addition to the configuration by the spherical shape, the bead spacer 24 may be constituted by a rod shape such as a circular column shape and a square column shape. However, the spacer that defines the thickness of the liquid crystal layer 14 is not limited to the bead spacer 24. For example, the spacer in a circular column shape can be provided by coating a photoresist on the first base material layer 21A side and then expose and develop it. Note that, description has been given of an example in which the spacer is provided in the second laminated body 13, but there is no limitation to the example. The spacer may be provided in both of the first laminated body 12 and the second laminated body 13, or only in the first laminated body 12.

The first alignment layer 23A and the second alignment layer 23B are formed by a photo-alignment layer. Various materials to which a photo-alignment method is applicable are widely applicable to a photo-alignment material applicable to the photo-alignment layer, and examples thereof include a photo-composition type material, a photo-dimerization type material, a photo-isomerization type material, and the like. In this embodiment, the photo-dimerization type material is utilized. Examples of the photo-dimerization type material include polymers including cinnamate, coumarin, benzylidenephthalimidine, benzylideneacetophenone, diphenylacetylene, stilbazole, uracil, quinolinone, maleimide, or a cinnamylideneacetic acid derivative, and the like. Among these, a polymer including one or both of cinnamate and coumarin is preferably utilized from the viewpoint of a satisfactory alignment regulation force. Specific example of the photo-dimerization type material include compounds described in Japanese Unexamined Patent Application, Publication No. 9-118717, Japanese Patent National Publication No. 10-506420, Japanese Patent National Publication No. 2003-505561, and WO 2010/150748. Note that, the alignment layer may be prepared by a rubbing treatment instead of the photo-alignment layer, or the alignment layer may be prepared by shaping a fine line-shaped unevenness. In addition, in this embodiment, description has been given of an aspect in which the light control film 10 includes the first alignment layer 23A and the second alignment layer 23B, but there is no limitation to the aspect, and the light control film 10 can be without the first alignment layer 23A and the second alignment layer 23B.

A guest-host liquid crystal composition and a dichroic dye composition can be widely applied to the liquid crystal layer 14. The guest-host liquid crystal composition may contain a chiral agent so that the liquid crystal material is aligned in a spiral shape in a thickness direction of the liquid crystal layer 14 when the liquid crystal material is horizontally aligned. Note that, in the light control film 10, a sealing material 25 is disposed to surround the liquid crystal layer 14. The first laminated body 12 and the second laminated body 13 are integrally held by the sealing material 25, and leakage of the liquid crystal material is prevented. For example, a thermosetting resin such as an epoxy resin and an acrylic resin, an ultraviolet curable resin, or the like is applicable to the sealing material 25.

The light control film 10 is constituted by a vertical alignment layer in which the first alignment layer 23A and the second alignment layer 23B are set to a pretilt-related alignment regulation force in a constant direction so that the alignment of the guest-host liquid crystal composition at the time of electric field application makes light-shielding state of the light control film 10. According to this, the light control film 10 is constituted as "normally clear". Note that, the pretilt-related alignment regulation force may be set such that alignment at the time of electric field application makes light transmitting state, and the light control film 10 may be constituted as "normally dark". Here, the "normally dark" is a structure in which a transmittance becomes the minimum when a voltage is not applied to liquid crystal, and a black screen is obtained. The "normally clear" is a structure in which a transmittance becomes the maximum when a voltage is not applied to liquid crystal to be transparent.

Note that, description has been given of an example in which the light control film 10 of this embodiment includes the guest-host type liquid crystal layer 14, but it is possible to employ a configuration in which the light control film 10 includes a liquid crystal layer 14 of a twisted nematic (TN) type, a vertical alignment (VA) type, an in-plane-switching (IPS) type, or the like which does not use the dichroic dye composition. In the case of including this type of liquid crystal layer 14, when a linear polarization layer is further provided on a surface of the first base material layer 21A and the second base material layer 21B, a function as the light control film is obtained.

A first glass plate 33A and a second glass plate 33B are plate glass that is disposed on front and rear surfaces of the laminated glass 1, respectively, and has a high light-transmitting property. In this embodiment, as the first glass plate 33A and the second glass plate 33B, plate glass having the thickness of 2 mm is used. The first glass plate 33A and the second glass plate 33B are formed in a three-dimensional curved surface in advance.

In this embodiment, as a first interlayer forming sheet 31A and a second interlayer forming sheet 31B, a sheet that is formed from a polyvinyl butyral (PVB) resin having a thickness of 760 μm is used. The first interlayer forming sheet 31A joins the first glass plate 33A and the light control film 10, and similarly, the second interlayer forming sheet 31B joins the second glass plate 33B and the light control film 10. In a state in which the laminated glass 1 is completed, the first interlayer forming sheet 31A and the second interlayer forming sheet 31B constitute a first interlayer and a second interlayer, respectively. Note that, as a material of the first interlayer forming sheet 31A and the second interlayer forming sheet 31B, an ethylene/vinyl acetate copolymer (EVA), a cycloolefin polymer (COP), or the like may be used. Tg of the first interlayer forming sheet 31A and the second interlayer forming sheet 31B is 70° C.

to 90° C. in the case of using the PVB, is −30° C. (melting point: 75° C.) in the case of using the EVA, and is 100° C. to 120° C. in the case of using the COP. In addition, the thickness of the first interlayer forming sheet 31A and the second interlayer forming sheet 31B may be appropriately selected depending on a material thereof and other factors.

(With Regard to Wrinkles of Light Control Film 10 in Laminated Glass 1)

The laminated glass 1 is formed as follows. The laminated body 30 in which the interlayer forming sheets and the light control film 10 are sandwiched between two sheets of plate glass is formed, and a preliminary pressing process, an autoclave process, or the like as a joining process in which the laminated body 30 is heated and pressed. According to this, the light control film 10 is jointed to the sheets of plate glass through the interlayer. In a case where the laminated glass 1 has a three-dimensional curved surface shape, the first glass plate 33A and the second glass plate 33B are provided in a state having the predetermined three-dimensional curved surface shape and the planar light control film 10, the first interlayer forming sheet 31A, and the second interlayer forming sheet 31B are sandwiched between the first glass plate and the second glass plate to form the laminated body 30, and the preliminary pressing process, the autoclave process, or the like as a joining process is performed. Accordingly, when the planar light control film 10 conforms to the first glass plate 33A and the second glass plate 33B having the three-dimensional curved surface shape, the light control film 10 is partially surplus with respect to the first glass plate 33A and the second glass plate 33B, and thus wrinkles may occur.

The wrinkles of the light control film 10 may occur in the autoclave process, or may occur in the preliminary pressing process that is performed prior to the autoclave process. The wrinkles of the light control film 10 are not preferable as it cause deterioration in the quality of the laminated glass 1. With regard to the three-dimensional curved surface shape of the laminated glass 1, the present inventors define a curvature evaluation value S for evaluating a curvature of three-dimensional curved surfaces of the first glass plate 33A and the second glass plate 33B on the light control film 10 side. In addition, the present inventors found that in the case of manufacturing the laminated glass 1 that has one or more evaluation rectangles of which the curvature evaluation value S exceeds a predetermined value, occurrence of the wrinkles can be reduced by using the light control film to which a three-dimensional curved surface shape corresponding to the three-dimensional curved surface shape of the laminated glass 1, that is, the three-dimensional curved surface of the first glass plate 33A and the second glass plate 33B on the light control film 10 side is applied in advance through thermoforming.

(With Regard to Three-Dimensional Curved Surface of Laminated Glass 1)

Figure 3:
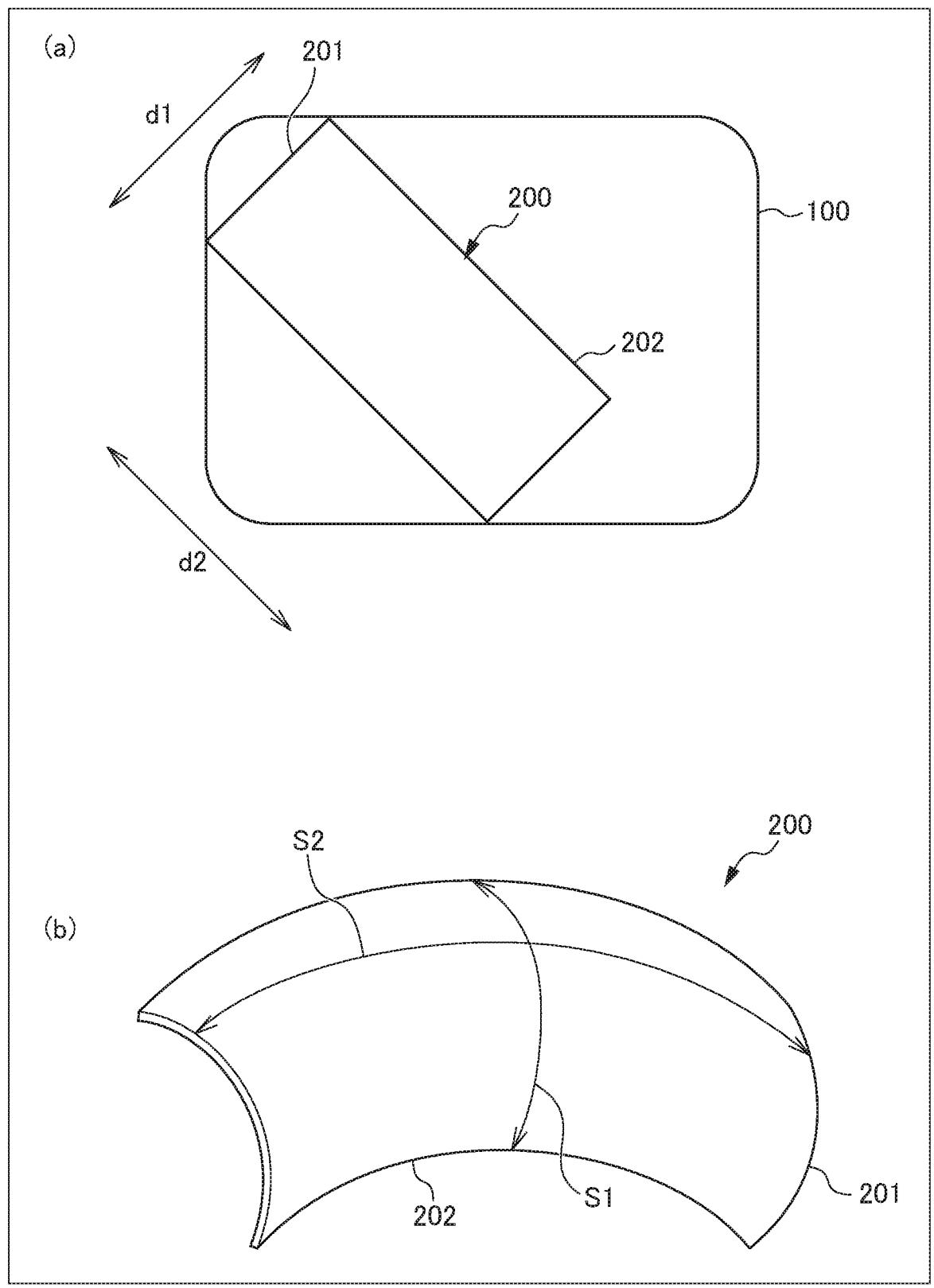
FIG. 3 is a view describing a curvature evaluation value S for evaluating a curvature of a three-dimensional curved surface of the laminated glass 1 of this embodiment.

Description will be given of the three-dimensional curved surface shape of the laminated glass 1 of this embodiment. FIG. 3 is a view describing the curvature evaluation value S for evaluating the curvature of the three-dimensional curved surface of the laminated glass 1 of this embodiment. Here, plan view of an external shape 100 of plate glass (here, temporarily, the second glass plate 33B) used in the laminated glass 1 is assumed as a square shape with curved corner portions as illustrated in FIG. 3(*a*). The second glass plate 33B has a three-dimensional curved surface shape. In this case, in the plan view of the external shape 100 of the second glass plate 33B, an evaluation rectangle 200 that is inscribed in the external shape 100 at least three points is defined, a direction parallel to one side 201 of the rectangle 200 is set as a first axial direction d1, and a direction parallel to another side is set as a second axial direction d2. The first axial direction d1 and the second axial direction d2 are orthogonal to each other in the plan view of the external shape 100 illustrated in FIG. 3(*a*).

Actually, the evaluation rectangle 200 has a three-dimensional curved surface shape as illustrated in FIG. 3(*b*). Accordingly, dimensions s1 and s2 along the first axial direction d1 and the second axial direction d2 are not actually constant, and a difference may occur depending on a location inside of the evaluation rectangle 200 in correspondence with the three-dimensional curved surface shape of the second glass plate 33B. For example, as going from a left end to a right end illustrated in FIG. 3(*b*) along the second axial direction d2, a value of the dimension s1 along the first axial direction d1 may fluctuate in correspondence with the three-dimensional curved surface shape of the second glass plate 33B. A difference between the maximum value and the minimum value of the dimension s1 (a variation amount of s1) and a difference between the maximum value and the minimum value of the dimension s2 (a variation amount of s2) are respectively obtained, and the greater one is set as the curvature evaluation value S of the evaluation rectangle 200. In addition, the evaluation rectangle 200 is variously set in the plan view of the external shape 100 of the plate glass and the curvature evaluation value S thereof is calculated. In the case of manufacturing the laminated glass 1 having at least one evaluation rectangle 200 of which curvature evaluation value S is 0.0003 mm or greater, that is, in a case where an arbitrary evaluation rectangle 200 of which the curvature evaluation value S is 0.0003 mm or greater can be set, it is possible to reduce the wrinkles of the light control film 10 by forming the light control film 10 into a shape corresponding to the three-dimensional curved surface shape of the plate glass (laminated glass 1) through the thermoforming process in advance to make the laminated body 30, and then the joining process for forming the laminated body 30 into the laminated glass 1, that is, the preliminary pressing process and the autoclave process are performed.

In addition, in the case that the three-dimensional curved surface is formed to the light control film 10 by performing the thermoforming process, in the joining process (the preliminary pressing process and the autoclave process) for obtaining the laminated glass 1, it is preferable that a heating temperature is set to be less than a glass transition point Tg of the first base material layer 21A and the second base material layer 21B of the light control film 10. The reason for this is because when the first base material layer 21A and the second base material layer 21B of the light control film 10 reach the glass transition point Tg or higher due to heating, the three-dimensional curved surface disappears, and thus the wrinkles of the light control film 10 are likely to occur in the laminated glass 1. Note that, for the above-described reason, it is possible to further reduce the wrinkles of the light control film (liquid crystal film) 10 when the light control film 10 is set not to be equal to or higher than the glass transition point Tg of the first base material layer 21A and the second base material layer 21B not only in the joining process but also in a process of manufacturing the laminated glass after the thermoforming process.

(Method for Manufacturing Laminated Glass 1)

Next, a method for manufacturing the laminated glass 1 of this embodiment will be described. When manufacturing the laminated glass 1 of this embodiment, as a preparation process for manufacturing the laminated glass 1, it is determined whether the three-dimensional curved surface shape of the laminated glass 1 (a three-dimensional curved surface of the first glass plate 33A and the second glass plate 33B on the light control film 10 side) has one or more evaluation rectangle 200 presenting the curvature evaluation value S of 0.0003 mm or greater to determine whether the thermoforming process with respect to the light control film 10 is necessary. In a case where the three-dimensional curved surface shape of the laminated glass 1 to be manufactured has one or more evaluation rectangles 200 presenting the curvature evaluation value S is 0.0003 mm or greater are included, the thermoforming process with respect to the light control film 10 is performed. Note that, in a case where the curvature evaluation value S of the laminated glass 1 is less than 0.0003 mm (the curvature evaluation value S of any evaluation rectangle 200 is less than 0.0003 mm), the thermoforming process for the light control film 10 is not necessary. From the viewpoint of reducing the wrinkles of the light control film 10, the thermoforming process for the light control film 10 is particularly effective for a case where a surface area of one surface of the laminated glass 1 is 25000 m2 or greater. In this embodiment, description will be given of a method for manufacturing the laminated glass 1 in which the thermoforming process is performed for the light control film 10.

Figure 4:
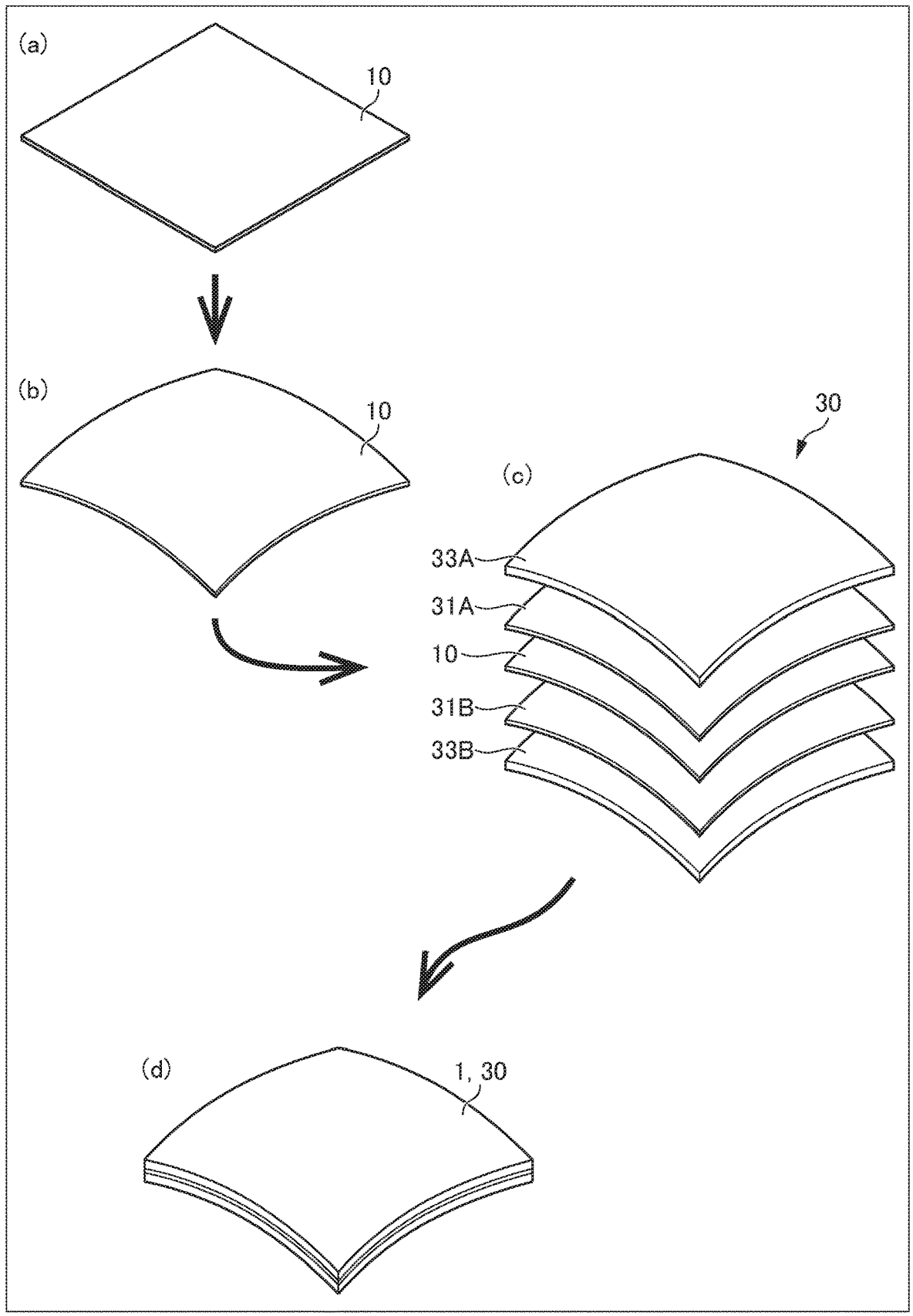
Figure 5:
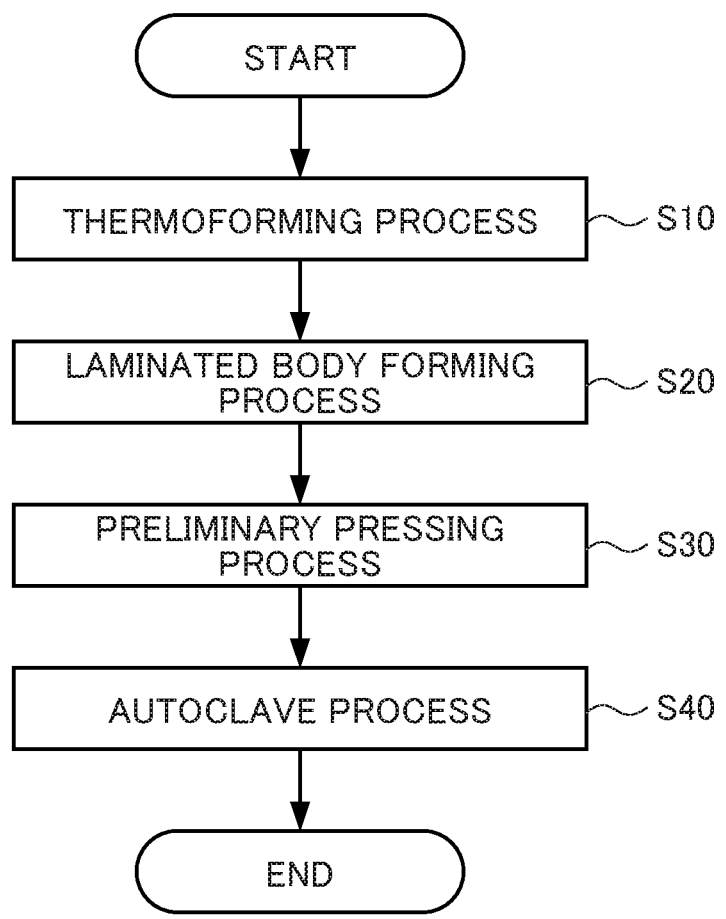
FIG. 5 is a flowchart illustrating a method for manufacturing the laminated glass 1 of this embodiment.

FIG. 4 is a view illustrating a flow of processes of manufacturing the laminated glass 1 of this embodiment by a perspective view or the like. FIG. 5 is a flowchart illustrating a method for manufacturing the laminated glass 1 of this embodiment. In the method for manufacturing the laminated glass 1 of this embodiment, first, the thermoforming process is performed for the light control film 10 in step (hereinafter, simply noted as "S") 10. In the thermoforming process, the light control film 10 is deformed from a flat state as illustrated in FIG. 4(a) to a shape conforming to the three-dimensional curved surface of the laminated glass 1 as illustrated in FIG. 4(b). In the thermoforming process, processing of the light control film 10 can be performed, for example, by a vacuum forming method, a hot press method, a bag method, or the like. Hereinafter, a thermoforming process using the vacuum forming method, the hot press method, and the bag method are exemplified and described, but the method of the thermoforming process is not limited thereto, and other methods can be used. Note that, in this embodiment, the thermoforming process is performed by the vacuum forming method.

Figure 6:
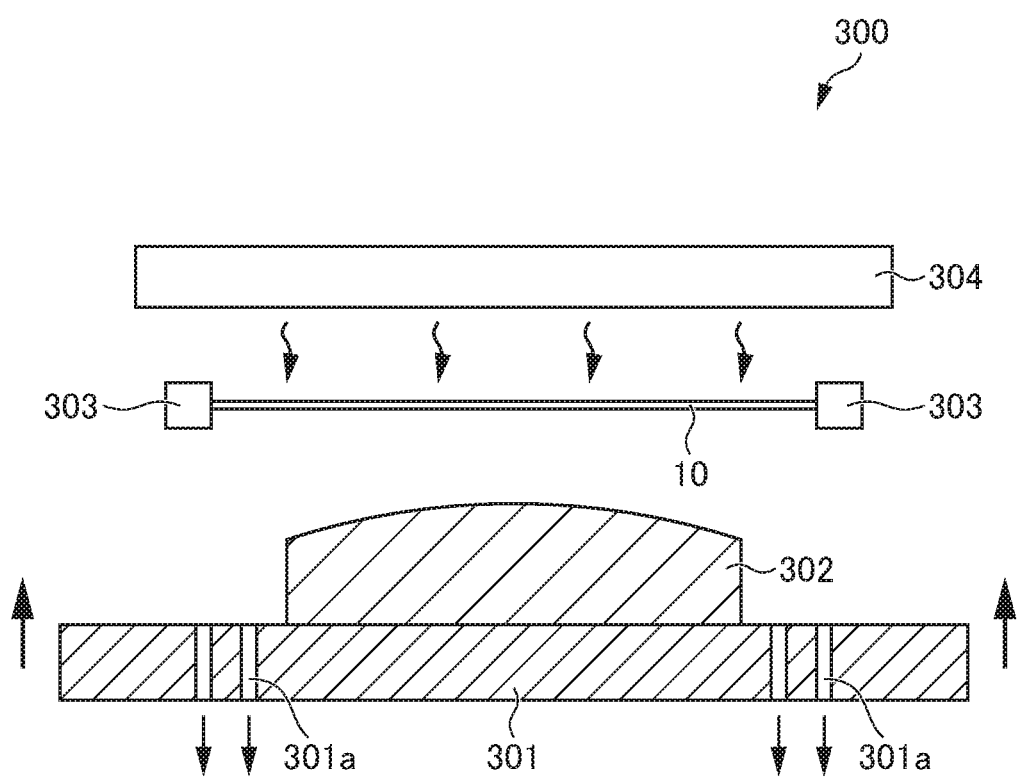
FIG. 6 is a view describing a case where a light control film 10 is thermoformed by a vacuum forming method using a vacuum forming device 300.

FIG. 6 is a view describing a case where the light control film 10 is thermoformed by the vacuum forming method using a vacuum forming device 300. The vacuum forming device 300 illustrated in FIG. 6 includes a suction stage 301, a forming die 302, a holding frame 303, and a heater 304. Here, a surface shape of the forming die 302 is set to a three-dimensional curved surface that matches a shape of the second glass plate 33B on an inner surface side (a side where the light control film 10 is disposed). In the thermoforming using the vacuum forming device 300, first, the light control film 10 is set and held in the holding frame 303. Next, the heater 304 heats the light control film 10 to a temperature equal to or higher than the glass transition point Tg of the first base material layer 21A and the second base material layer 21B of the light control film 10. Then, the heater 304 is retreated, the suction stage 301 and the forming die 302 are moved toward the light control film 10, and the forming die 302 is pressed against the light control film 10. In addition, air is suctioned from a suction hole 301a provided in the suction stage 301, and the light control film 10 is brought into close contact with the forming die 302 at a pressure of ½ atmosphere or higher. The light control film 10 is cooled down to a temperature lower than the Tg while maintaining the above-described state, and thus the light control film 10 is formed into a shape following the shape of the forming die 302.

Figure 7:
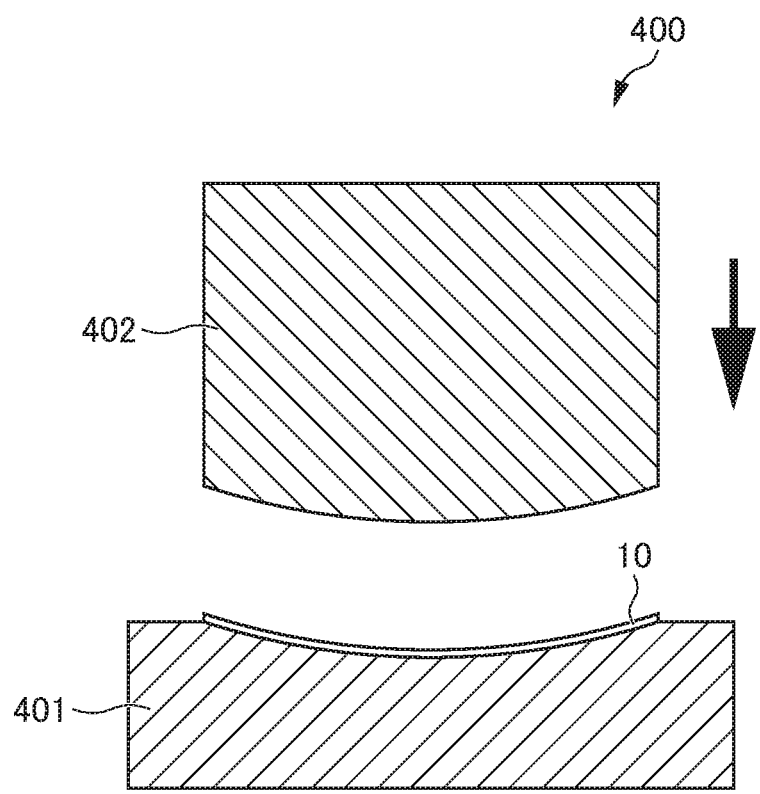
FIG. 7 is a view describing a case where the light control film 10 is thermoformed by a hot press method using a hot press device 400.

FIG. 7 is a view describing a case where the light control film 10 is thermoformed by the hot press method using a hot press device 400. The hot press device 400 includes a lower thermoforming die 401 and an upper thermoforming die 402. A heater is embedded in the lower thermoforming die 401. Surface shapes (die shapes) of the lower thermoforming die 401 and the upper thermoforming die 402 are constituted by a three-dimensional curved surface that matches the shape of the second glass plate 33B on the inner surface side (the side where the light control film 10 is disposed).

In a thermoforming process using the hot press device 400, the light control film 10 is set on the lower thermoforming die 401 and the light control film 10 is heated at a temperature equal to or higher than the glass transition point Tg of the first base material layer 21A and the second base material layer 21B of the light control film 10. The upper thermoforming die 402 is pushed down and pressed at a pressure of ½ atmosphere or higher, thereby forming the light control film 10. The light control film 10 is cooled down to a temperature lower than the Tg while maintaining the above-described state, and thus the light control film 10 is formed into a shape following the shape of the lower thermoforming die 401. Note that, in the hot press device 400, a heater may also be provided in the upper thermoforming die 402 without limitation to the above-described example. A balloon that expands by an air pressure or a sandbag may be utilized instead of the upper thermoforming die 402.

FIG. 8 is a view describing a case where the light control film 10 is thermoformed by a bag method using a bag device 500. The bag device 500 includes a bag 501, a forming die 502, and an oven 503. The bag 501 is a bag-shaped member formed from rubber having heat resistance and flexibility, and has a size capable of sufficiently accommodating the forming die 502 and the light control film 10 disposed on the forming die 502. The forming die 502 has a surface shape having a three-dimensional curved surface, and the light control film 10 can be placed on a surface 502a on an upper side of the forming die 502. The surface shape (die shape) of the forming die 502 is constituted by a three-dimensional curved surface that matches the shape of the second glass plate 33B on the inner surface side (the side where the light control film 10 is disposed). In a thermoforming process using the bag device 500, the forming die 502 on which the light control film 10 is placed is set in the bag 501, the bag 501 in which the light control film 10 has been set on the bag device 500 is disposed in the oven 503, and is heated to a temperature equal to or higher than the glass transition point Tg of the first base material layer 21A and the second base material layer 21B of the light control film 10. In addition, air is suctioned from a ventilation hole 501a provided in the bag 501 to bring the light control film 10 into close contact with the forming die 502 at a pressure of ½ atmosphere or higher, and the bag is taken out from the oven while maintaining this state to cool down the light control film 10 to a temperature lower than the Tg. According to this, the light control film 10 is formed into a shape following the shape of the forming die 502.

Returning to FIG. 5, after the thermoforming process in S10, in S20, the light control film (liquid crystal film) 10, the first interlayer forming sheet 31A and the second interlayer forming sheet 31B are sandwiched between the first glass plate 33A and the second glass plate 33B to form the laminated body 30 (a laminated body forming process). Next, a joining process for forming the laminated body 30 into the laminated glass 1 is performed. In this embodiment, a preliminary pressing process in S30 and an autoclave process in S40 are the joining process. In S30, the preliminary pressing process is performed by various methods. The preliminary pressing process is a process of heating and pressing the laminated body 30 to join respective members of the laminated body 30. Note that, from the viewpoint of suppressing the wrinkles of the light control film 10, it is preferable that a heating temperature in the preliminary pressing process performed after the thermoforming process, is set to be lower than the glass transition point Tg of the first base material layer 21A and the second base material layer 21B of the light control film 10. The reason for this is because when the first base material layer 21A and the second base material layer 21B of the light control film 10 reach a temperature equal to or higher than the glass transition point Tg thereof due to heating, a force causing the three-dimensional curved surface shaped in the thermoforming process to return into an original flat shape acts, and thus the wrinkles of the light control film 10 occurs in the laminated glass 1. It is preferable that the preliminary pressing process is performed by, for example, a vacuum bag method, a vacuum laminating method, a tube method, or the like. In this embodiment, the preliminary pressing process is performed by using the vacuum bag method.

Next, in S40, the autoclave process is performed. In the autoclave process, the laminated body 30 for which the preliminary pressing process is finished is moved into a pressure container for autoclave, the laminated body 30 is left under a high-pressure and high-temperature environment for a predetermined time to strengthen joining of respective members of the laminated body 30 and to raise the strength as the laminated glass 1. At this time, it is preferable that the heating temperature is set to be lower than the glass transition point Tg of the first base material layer 21A and the second base material layer 21B of the light control film 10 from the viewpoint of suppressing the wrinkles of the light control film 10. The reason for this is also because when the first base material layer 21A and the second base material layer 21B of the light control film 10 reach a temperature equal to or higher than the glass transition point Tg thereof due to heating, a force causing the three-dimensional curved surface shaped in the thermoforming process to return into a flat shape acts, and thus the wrinkles of the light control film 10 occurs in the laminated glass 1. In this embodiment, the first base material layer 21A and the second base material layer 21B are formed from polycarbonate as described above, the laminated body 30 after the preliminary pressing process was left under an environment of 120° C. and eight atmospheres in the autoclave process. When the autoclave process is finished, the laminated glass 1 is completed. Note that, a cutting process of adjusting the external shape can be performed as necessary. Note that, as described above, in a process subsequent to the thermoforming process, since the light control film 10 is not set to a temperature equal to or higher than the glass transition point Tg of the first base material layer 21A and the second base material layer 21B, and thus it is possible to further reduce occurrence of the wrinkles of the light control film 10.

Note that, necessity and non-necessity of the thermoforming process are determined in the preparation process for manufacturing the laminated glass 1, but as described above, the thermoforming process for the light control film 10 is not necessary in a case where the curvature evaluation value S of the laminated glass 1 is less than 0.0003 mm (the curvature evaluation value S of any evaluation rectangle 200 is less than 0.0003 mm). Accordingly, the laminated glass 1 can be manufactured by performing the laminated body forming process, the preliminary pressing process, the autoclave process, and the like without performing the thermoforming process. In this case, the heating temperature in the preliminary pressing process and the autoclave process may exceed the glass transition point Tg of the first base material layer 21A and the second base material layer 21B.

According to the method for manufacturing the laminated glass in the above-described embodiment, since the thermoforming process is performed to obtain the light control film 10 having the three-dimensional curved surface shape conforming to the three-dimensional curved surface of the laminated glass 1, and the preliminary pressing process and the autoclave process are performed by using the light control film 10, the light control film 10 is evenly disposed with respect to the laminated body 30 (laminated glass 1), and thus it is possible to reduce occurrence of the wrinkles due to surplus or the like, sufficient joining is obtained, and strength as the laminated glass 1 is also maintained.

(Evaluation on Presence or Absence of Occurrence of Wrinkles of Light Control Film 10)

The laminated glasses were manufactured while changing the size, the three-dimensional curved surface, and the like of the laminated glasses 1 to be manufactured, and changing the evaluation value of the light control film, and presence or absence of the thermoforming process, and the like. Then, presence or absence of the wrinkles of the light control film sandwiched between sheets of plate glass were evaluated. The three-dimensional curved surface shapes of the laminated glasses used in the evaluation were prepared in two examples, a radius of curvature Rx of an X-axis and a radius of curvature Ry of a Y-axis are set to be the same as each other in one example, and Rx and Ry are set to be different from each other in the other example. In addition, in the two examples of the three-dimensional curved surface shape of the laminated glass, laminated glasses with a plurality of sizes (lengths of the X-axis and the Y-axis) were prepared. In addition, with respect to each example, the curvature evaluation value S was calculated, the light control film 10 that was subjected to the thermoforming process and the light control film 10 that was not subjected to the thermoforming process were prepared, each laminated glass 1 was prepared, and presence or absence of occurrence of the wrinkles was evaluated. Results are shown in Table 1 and Table 2 to be described below. In Tables 1 and 2, samples in which wrinkles occurred in the light control film after the preliminary pressing process or the autoclave process are indicated by "bad" in the tables, and samples in which wrinkles did not occur are indicated by "good" in the tables. Note that, in the process of manufacturing the laminated glass, the thermoforming process was performed by using the vacuum forming method, and the preliminary pressing process was performed by using the vacuum bag method. In the preliminary pressing process or the autoclave process, the heating temperature was set to a temperature lower than the glass transition point Tg of the base materials of the light control film 10. In addition, the curvature evaluation value S of each sample shown in Table 1, Table 2, and Table 3 to be described later is the maximum value among laminated glass curvature evaluation values S of the sample, and each sample in which the curvature evaluation value S is 0.0003 mm or greater has one or more evaluation rectangles 200 of which the curvature evaluation value S is 0.0003 mm or greater.

TABLE 1

|  | Sample11 | Sample12 | Sample13 | Sample14 | Sample15 |
|---|---|---|---|---|---|
| X-AXIS LENGTH (mm) | 45 | 45 | 50 | 50 | 70 |
| Y-AXIS LENGTH (mm) | 200 | 200 | 250 | 250 | 150 |
| RADIUS OF CURVATURE OF X-AXIS (mm) | 500 | 500 | 500 | 500 | 500 |
| RADIUS OF CURVATURE OF Y-AXIS (mm) | 2000 | 2000 | 2000 | 2000 | 2000 |
| Curvature evaluation value S (mm) | 0.000153 | 0.000153 | 0.00033 | 0.00033 | 0.000324 |
| Thermoforming | not performed | performed | not performed | performed | not performed |
| Wrinkles | good | good | bad | good | bad |

|  | Sample16 | Sample17 | Sample18 | Sample19 | Sample20 |
|---|---|---|---|---|---|
| X-AXIS LENGTH (mm) | 70 | 150 | 150 | 262 | 262 |
| Y-AXIS LENGTH (mm) | 150 | 200 | 200 | 328 | 328 |
| RADIUS OF CURVATURE OF X-AXIS (mm) | 500 | 500 | 500 | 500 | 500 |
| RADIUS OF CURVATURE OF Y-AXIS (mm) | 2000 | 2000 | 2000 | 2000 | 2000 |
| Curvature evaluation value S (mm) | 0.000324 | 0.005789 | 0.005789 | 0.087921 | 0.087921 |
| Thermoforming | performed | not performed | performed | not performed | performed |
| Wrinkles | good | bad | good | bad | good |

TABLE 2

|  | Sample11 | Sample12 | Sample13 | Sample14 | Sample15 |
|---|---|---|---|---|---|
| X-AXIS LENGTH (mm) | 45 | 45 | 50 | 50 | 70 |
| Y-AXIS LENGTH (mm) | 200 | 200 | 250 | 250 | 150 |
| RADIUS OF CURVATURE OF X-AXIS (mm) | 500 | 500 | 500 | 500 | 500 |
| RADIUS OF CURVATURE OF Y-AXIS (mm) | 2000 | 2000 | 2000 | 2000 | 2000 |
| Curvature evaluation value S (mm) | 0.000153 | 0.000153 | 0.00033 | 0.00033 | 0.000324 |
| Thermoforming | not performed | performed | not performed | performed | not performed |
| Wrinkles | good | good | bad | good | bad |

|  | Sample16 | Sample17 | Sample18 | Sample19 | Sample20 |
|---|---|---|---|---|---|
| X-AXIS LENGTH (mm) | 70 | 150 | 150 | 262 | 262 |
| Y-AXIS LENGTH (mm) | 150 | 200 | 200 | 328 | 328 |
| RADIUS OF CURVATURE OF X-AXIS (mm) | 500 | 500 | 500 | 500 | 500 |
| RADIUS OF CURVATURE OF Y-AXIS (mm) | 2000 | 2000 | 2000 | 2000 | 2000 |
| Curvature evaluation value S (mm) | 0.000324 | 0.005789 | 0.005789 | 0.087921 | 0.087921 |
| Thermoforming | performed | not performed | performed | not performed | performed |
| Wrinkles | good | bad | good | bad | good |

As shown in Table 1 and Table 2, with regard to samples in which the maximum value of the curvature evaluation value S is 0.0003 mm or greater and which are not subjected to the thermoforming process, wrinkles occurred after the preliminary pressing process or the autoclave process, and the samples were not appropriate for use. Note that, with regard to samples in which the maximum value of the curvature evaluation value S is 0.0003 mm or greater and which are not subjected to the thermoforming process, occurrence of the wrinkles is relatively smaller with respect to the samples in which the maximum value of the curvature evaluation value S is relatively small (for example, Samples 3, 5, 7, 13, and 15) in comparison to the samples in which the maximum value of the curvature evaluation value S is large. In addition, the wrinkles did not occur after the preliminary pressing process or the autoclave process with regard to samples in which the maximum value of the curvature evaluation value S is 0.0003 mm and which are subjected to the thermoforming process. In addition, the wrinkles did not occur regardless of presence or absence of the thermoforming process with regard to samples in which the curvature evaluation value S is less than 0.0003 mm.

Next, samples having a constant length of the X-axis and a constant length of the Y-axis and having various radiuses of curvature Rx or Ry of each axis are prepared to change the value of the curvature evaluation value S, and evaluation was made as to whether or not forming of the three-dimensional curved surface can be satisfactorily performed by the thermoforming. Results are shown in Table 3 to be described below. In Table 3, samples in which the three-dimensional curved surface was sufficiently formed by the thermoforming process are indicated by "good", and samples in which the three-dimensional curved surface was not sufficient are indicated by "bad".

TABLE 3

|  | Sample21 | Sample22 | Sample23 | Sample24 |
| --- | --- | --- | --- | --- |
| X-AXIS LENGTH (mm) | 242 | 242 | 242 | 242 |
| Y-AXIS LENGTH (mm) | 308 | 308 | 308 | 308 |
| RADIUS OF CURVATURE OF X-AXIS (mm) | 1150 | 500 | 400 | 250 |
| RADIUS OF CURVATURE OF Y-AXIS (mm) | 1150 | 2000 | 2000 | 1000 |
| Curvature evaluation value S (mm) | 0.008236 | 0.060335 | 0.122282 | 1.246803 |
| Thermoforming | good | good | good | bad |

As shown in Table 3, in cases where the curvature evaluation value S is 1.24 mm or less, the three-dimensional curved surface was sufficiently formed, but in a case where the curvature evaluation value S exceeds 1.24 mm, forming of the three-dimensional curved surface for the light control film 10 by the thermoforming was difficult.

Next, occurrence of the wrinkles and the like were evaluated by changing materials of the base materials of the light control film, the heating temperature in the thermoforming process, the heating temperature in the preliminary pressing process and the autoclave process, or the like. Results are shown in Table 4 to be described below. In Table 4, samples in which the three-dimensional curved surface was sufficiently formed by the thermoforming process are indicated by "good", and samples in which the three-dimensional curved surface was not sufficient are indicated by "bad". In addition, in Table 4, with regard to presence or absence of the wrinkles after the preliminary pressing process and the autoclave process, samples in which the wrinkles occurred are indicated by "bad", and samples in which the wrinkles did not occur are indicated by "good". Note that, in the evaluation, the evaluation was terminated in a case where the forming of the three-dimensional curved surface for the light control film 10 by the thermoforming process was not sufficient, and the subsequent preliminary pressing process and autoclave process were not performed. In addition, the evaluation was terminated with regard to samples in which the wrinkles occurred in the preliminary pressing process, and the autoclave process was not performed. Note that, the maximum value of the curvature evaluation value S of the laminated glass used in the evaluation was 0.088 mm, and thus the maximum value was 0.0003 mm or greater and 1.24 mm or less and satisfied a preferable range. In addition, in the evaluation, the thickness of the first base material layer 21A and the second base material layer 21B was 100 μm, and the size of the laminated glass 1 of the sample is 262 mm×328 mm.

TABLE 4

| | Base material | Ts | Thermoforming Temperature | Forming | Preliminary pressing Temperature | Wrinkles | Autoclave Temperature | Wrinkles |
|---|---|---|---|---|---|---|---|---|
| Sample25 | pET | 80° C. | Lower than Tg | bad | Lower than Tg | — | Lower than Tg | — |
| Sample26 | | | Tg | bad | Lower than Tg | — | Tg or higher | — |
| Sample27 | | | | bad | Tg or higher | — | Lower than Tg | — |
| Sample28 | | | | bad | Tg or higher | — | Tg or higher | — |
| Sample29 | | | Tg or higher | good | Lower than Tg | good | Lower than Tg | good |
| Sample30 | | | | good | Lower than Tg | good | Not-performed | good |
| Sample31 | | | | good | Lower than Tg | good | Tg or higher | bad |
| Sample32 | | | | good | Tg or higher | bad | Lower than Tg | — |
| Sample33 | | | | good | Tg or higher | bad | Tg or higher | — |
| Sample34 | PC | 150° C. | Lower than Tg | bad | Lower than Tg | — | Lower than Tg | — |
| Sample35 | | | Tg | bad | Lower than Tg | — | Tg or higher | — |
| Sample36 | | | | bad | Tg or higher | — | Lower than Tg | — |
| Sample37 | | | | bad | Tg or higher | — | Tg or higher | — |
| Sample38 | | | Tg or higher | good | Lower than Tg | good | Lower than Tg | good |
| Sample39 | | | | good | Lower than Tg | good | Not-performed | good |
| Sample40 | | | | good | Lower than Tg | good | Tg or higher | bad |
| Sample41 | | | | good | Tg or higher | bad | Lower than Tg | — |
| Sample42 | | | | good | Tg or higher | bad | Tg or higher | — |
| Sample43 | COP | 160° C. | Lower than Tg | bad | Lower than Tg | — | Lower than Tg | — |
| Sample44 | | | Tg | bad | Lower than Tg | — | Tg or higher | — |
| Sample45 | | | | bad | Tg or higher | — | Lower than Tg | — |
| Sample46 | | | | bad | Tg or higher | — | Tg or higher | — |
| Ssmple47 | | | Tg or higher | good | Lower than Tg | good | Lower than Tg | good |
| Sample48 | | | | good | Lower than Tg | good | Not-performed | good |
| Sample49 | | | | good | Lower than Tg | good | Tg or higher | bad |
| Sample50 | | | | good | Tg or higher | bad | Lower than Tg | — |
| Sample51 | | | | good | Tg or higher | bad | Tg or higher | — |

In Table 4, with regard to Sample 30, Sample 39 and Sample 48, a material (for example, Melthene (registered trademark) G: polyolefin-based adhesive polymer (manufactured by TOSOH CORPORATION)) for which autoclave is not necessary was used as the interlayer, and thus the autoclave was not performed. In addition, since the autoclave is not performed, the evaluation remains "good". As shown in Table 4, in the case of satisfying the following three conditions, the wrinkles of the light control film did not occur in the laminated glasses using any of PC, PET, and COP as the material of the base materials; however, but in the case of not satisfying any one of the conditions, forming of the three-dimensional curved surface by the thermoforming process was not sufficient, or the wrinkles of the light control film occurred.

(1) In the thermoforming process, the heating temperature is set to be equal to or higher than the glass transition point Tg of the first base material layer 21A and the second base material layer 21B.

(2) In the preliminary pressing process, the heating temperature is set to be less than the glass transition point Tg of the first base material layer 21A and the second base material layer 21B.

(3) In the autoclave process, the heating temperature is set to be less than the glass transition point Tg of the first base material layer 21A and the second base material layer 21B. However, the autoclave process may not be performed in the case a material for which the autoclave is not necessary as the material of the interlayer.

As described above, according to this embodiment, when manufacturing the laminated glass 1 having one or more evaluation rectangles 200 of which the curvature evaluation value S is 0.0003 mm or greater, the thermoforming process of forming the three-dimensional curved surface by heating the light control film (liquid crystal film) 10 including the liquid crystal layer 14 to a temperature equal to or higher than the glass transition point Tg of the first base material layer 21A and the second base material layer 21B is performed, and the heating temperature in the preliminary pressing process or the autoclave process as a joining process is set to be less than the glass transition point Tg of the first base material layer 21A and the second base material layer 21B. According to this, the laminated glass with high quality can be manufactured without occurrence of the wrinkles in the light control film 10 in the preliminary pressing process or the autoclave process. In addition, according to this embodiment, when manufacturing the laminated glass 1 that does not have the evaluation rectangle 200 of which the curvature evaluation value S is 0.0003 mm or greater, the laminated glass with high quality can be manufactured as the wrinkles in the light control film do not occur even when performing the preliminary pressing process or the autoclave process as a joining process without performing the thermoforming process.

(Additional Evaluation)

The laminated glass 1 is formed as follows. The laminated body 30 in which the interlayer forming sheets and the light control film 10 are sandwiched between two sheets of plate glass is formed, and the preliminary pressing process, the autoclave process, or the like as a joining process of performing heating and pressing are performed with respect to the laminated body 30. According to this, the light control film 10 is jointed to the sheets of plate glass through the interlayer. Here, as in this embodiment, in a case where the laminated glass 1 has the three-dimensional curved surface shape, the first glass plate 33A and the second glass plate 33B are provided in a state having the predetermined three-dimensional curved surface shape, and the planar light control film 10 and the first interlayer forming sheet 31A and the second interlayer forming sheet 31B are sandwiched between the two sheets of glass plate to form the laminated body 30, and the preliminary pressing process and the autoclave process or the like as a joining process are performed. According to this, when the planar light control film 10 conforms to the first glass plate 33A and the second glass plate 33B having the three-dimensional curved surface shape, the light control film 10 is partially surplus with respect to the first glass plate 33A and the second glass plate 33B, and thus wrinkles may occur, or air bubbles in the interlayer may occur.

The wrinkles or the air bubbles of the light control film 10 may occur in the autoclave process, or may occur in the preliminary pressing process that is performed prior to the autoclave process. The wrinkles and the air bubbles of the light control film 10 are not preferable as it cause deterioration in the quality of the laminated glass 1.

A main factor of the wrinkles and the air bubbles is that the planar light control film 10 cannot conform to the three-dimensional curved surface of the first glass plate 33A and the second glass plate 33B. The majority of physical properties of the light control film 10 greatly depend on physical properties of the first base material layer 21A and the second base material layer 21B. Accordingly, it is possible to suppress occurrence of the wrinkles and the air bubbles by appropriately selecting a material that is utilized as the first base material layer 21A and the second base material layer 21B. Here, a plurality of the materials utilized as the first base material layer 21A and the second base material layer 21B were prepared, manufacturing of the laminated glasses was actually performed, and then experiments were performed to investigate conditions appropriate as the material of the first base material layer 21A and the second base material layer 21B.

It has been proved that the glass transition point is particularly important among various characteristic values of the first base material layer 21A and the second base material layer 21B which are utilized in the laminated glass. Here, first, experiments with focus given to the glass transition point of the first base material layer 21A and the second base material layer 21B were performed under the above-described conditions.

Table 5 collectively shows experiment results obtained by investigating an influence of a temperature in a process of manufacturing the laminated glass for every base material. In the experiment relating to Table 5 and Table 4 previously shown, the thermoforming process was performed by using the vacuum forming method and the preliminary pressing process was performed by using the vacuum bag method in the process of manufacturing the laminated glass. In addition, with regard to a radius of curvature of the three-dimensional curved surface of the first glass plate 33A and the second glass plate 33B, the X-axis and the Y-axis orthogonal to each other were set as central axes, and the radius of curvature Rx around the X-axis was set to 500 mm, and the radius of curvature Ry around the Y-axis was set to 2000 mm.

TABLE 5

| Base material | Tg | Thermo-forming temperature | Thermo-forming evaluation | Air bubble evaluation | Preliminary pressing temperature | Wrinkle evaluation after preliminary pressing | Interlayer bonding evaluation | Liquid crystal accumulation | AC temperature | Wrinkle evaluation after AC | Interlayer bonding evaluation | Reliability test temperature | Wrinkle evaluation during storage |
|---|---|---|---|---|---|---|---|---|---|---|---|---|---|
| PET | 80° C. | 70° C. | acceptable | excellent | 70° C. | good | bad | excellent | 70° C. | good | bad | 70° C. | good |
| | | 80° C. | good | excellent | 80° C. | good | acceptable | good | 80° C. | good | bad | 80° C. | good~acceptable |
| | | 90° C. | good | excellent | 90° C. | acceptable | acceptable | acceptable | 90° C. | acceptable | bad | 90° C. | acceptable |
| | | 100° C. | good | excellent | 100° C. | bad | acceptable | acceptable | 100° C. | bad | acceptable | 100° C. | bad |
| | | 110° C. | good | excellent | 110° C. | bad | good | acceptable | 110° C. | bad | acceptable | 110° C. | bad |
| | | 120° C. | good | excellent | 120° C. | bad | good | acceptable | 120° C. | bad | good | 120° C. | bad |
| | | 130° C. | good | good | 130° C. | bad | excellent | acceptable | 130° C. | bad | good | 130° C. | bad |
| | | 140° C. | good | good | 140° C. | bad | excellent | bad | 140° C. | bad | good | 140° C. | bad |
| | | 150° C. | good | good | 150° C. | bad | excellent | bad | 150° C. | bad | good | 150° C. | bad |
| | | 160° C. | good | acceptable | 160° C. | bad | excellent | bad | 160° C. | bad | good | 160° C. | bad |
| | | 170° C. | good | acceptable | 170° C. | bad | excellent | bad | 170° C. | bad | good | 170° C. | bad |
| | | 180° C. | good | bad | 180° C. | bad | excellent | bad | 180° C. | bad | good | 180° C. | bad |
| PC | 150° C. | 70° C. | bad | excellent | 70° C. | good | bad | excellent | 70° C. | good | bad | 70° C. | good |
| | | 80° C. | bad | excellent | 80° C. | good | acceptable | good | 80° C. | good | bad | 80° C. | good |
| | | 90° C. | bad | excellent | 90° C. | good | acceptable | acceptable | 90° C. | good | bad | 90° C. | good |
| | | 100° C. | bad | excellent | 100° C. | good | acceptable | acceptable | 100° C. | good | acceptable | 100° C. | good |
| | | 110° C. | bad | excellent | 110° C. | good | good | acceptable | 110° C. | good | acceptable | 110° C. | good |
| | | 120° C. | bad | excellent | 120° C. | good | good | acceptable | 120° C. | good | good | 120° C. | good |
| | | 130° C. | bad | good | 130° C. | good | excellent | acceptable | 130° C. | good | good | 130° C. | good |
| | | 140° C. | acceptable | good | 140° C. | good | excellent | bad | 140° C. | good | good | 140° C. | good |
| | | 150° C. | good | good | 150° C. | good | excellent | bad | 150° C. | good | good | 150° C. | good~acceptable |
| | | 160° C. | good | acceptable | 160° C. | acceptable | excellent | bad | 160° C. | acceptable | good | 160° C. | acceptable |
| | | 170° C. | good | acceptable | 170° C. | bad | excellent | bad | 170° C. | bad | good | 170° C. | bad |
| | | 180° C. | good | bad | 180° C. | bad | excellent | bad | 180° C. | bad | good | 180° C. | bad |
| COP | 160° C. | 70° C. | bad | excellent | 70° C. | good | bad | excellent | 70° C. | good | bad | 70° C. | good |
| | | 80° C. | bad | excellent | 80° C. | good | acceptable | good | 80° C. | good | bad | 80° C. | good |
| | | 90° C. | bad | excellent | 90° C. | good | acceptable | acceptable | 90° C. | good | bad | 90° C. | good |
| | | 100° C. | bad | excellent | 100° C. | good | acceptable | acceptable | 100° C. | good | acceptable | 100° C. | good |
| | | 110° C. | bad | excellent | 110° C. | good | good | acceptable | 110° C. | good | acceptable | 110° C. | good |
| | | 120° C. | bad | excellent | 120° C. | good | good | acceptable | 120° C. | good | good | 120° C. | good |
| | | 130° C. | bad | good | 130° C. | good | excellent | acceptable | 130° C. | good | good | 130° C. | good |
| | | 140° C. | bad | good | 140° C. | good | excellent | bad | 140° C. | good | good | 140° C. | good |
| | | 150° C. | acceptable | good | 150° C. | good | excellent | bad | 150° C. | good | good | 150° C. | good |
| | | 160° C. | good | acceptable | 160° C. | good | excellent | bad | 160° C. | good | good | 160° C. | good~acceptable |
| | | 170° C. | good | acceptable | 170° C. | acceptable | excellent | bad | 170° C. | acceptable | good | 170° C. | acceptable |
| | | 180° C. | good | bad | 180° C. | bad | excellent | bad | 180° C. | bad | good | 180° C. | bad |

Evaluation results in Table 5 and Table 4 were obtained by visual evaluation. Note that, "excellent", "good", "acceptable", and "bad" in Table 5 and Table 4 indicate that results are satisfactory in this order. That is, "excellent" indicates the best result, "good" indicates that a result is slightly inferior to "excellent" but is usable without any problem, "acceptable" indicates that a result is inferior to "excellent" and "good" but can be used as a product, and "bad" indicates a result that is not usable as a product. In addition, "AC" in Table 5 and Table 4 indicates "autoclave". With respect to an item of "reliability evaluation" in Table 5, the completed laminated glass 1 was left for a long time in a state of being reheated at a temperature illustrated in the same item and occurrence of the wrinkles was visually confirmed. "Wrinkle evaluation during storage" column indicates the result of the confirming.

From the results in Table 5 and Table 4, the following can be seen.

(Condition 1)

First, as shown in a column of the evaluation result of interlayer bonding after preliminary pressing and after autoclave (AC), it is preferable that a temperature at which the preliminary pressing is performed and a temperature at which the autoclave is performed are set to 100° C. or higher. Particularly, it can be seen that it is preferable to set the preliminary pressing temperature to 130° C. or higher as "excellent" evaluation is obtained in the column of the evaluation result of interlayer bonding after preliminary pressing.

(Condition 2)

On the other hand, from a column of wrinkle evaluation after preliminary pressing and a column of wrinkle evaluation after autoclave, it can be seen that preliminary pressing and autoclave are necessary to be performed at a temperature less than Tg of the base materials. As described above, it is considered that the reason for this is because when the first base material layer 21A and the second base material layer 21B of the light control film 10 reach the glass transition point Tg or higher due to heating, a force causing the three-dimensional curved surface shaped in the thermoforming process to return into an original flat shape acts.

Here, to satisfy Condition 1 and Condition 2 described above, it is necessary for the Tg of the first base material layer 21A and the second base material layer 21B is set to be equal to or higher than a processing temperature of the preliminary pressing process and the autoclave process (100° C. or higher, and more preferably 130° C. or higher). From this, it can be seen that the Tg of the first base material layer 21A and the second base material layer 21B is preferably set to 100° C. or higher, and more preferably 130° C.

Table 6 is a table collectively showing experiment results obtained by investigating an influence on the laminated glass by conditions other than Tg of the first base material layer 21A and the second base material layer 21B. In the experiment relating to Table 6, in a process of manufacturing the laminated glass, the thermoforming process was performed by using the vacuum forming method, and the preliminary pressing process was performed by using the vacuum bag method. In the thermoforming process, the heating temperature was set to Tg+5° C. by adding a margin to the glass transition point Tg of the first base material layer 21A and the second base material layer 21B of the light control film 10. In the preliminary pressing process and the autoclave process, the heating temperature was set to a temperature lower than the glass transition point Tg of the first base material layer 21A and the second base material layer 21B of the light control film 10. In addition, with regard to the radius of curvature of the three-dimensional curved surface of the first glass plate 33A and the second glass plate 33B, the X-axis and the Y-axis orthogonal to each other were set as central axes, and the radius of curvature Rx around the X-axis was set to 500 mm, and the radius of curvature Ry around the Y-axis was set to 2000 mm.

In the experiment related to Table 6, a focus was given to a material, the thickness, presence or absence of stretching, Young's modules, and presence or absence of the thermoforming of the first base material layer 21A and the second base material layer 21B, and evaluated an influence of these factors on conformity to the three-dimensional curved surface in the thermoforming (in Table 6, noted as 3D conformity in thermoforming), wrinkles and interlayer air bubbles after completion of the laminated glass. In the experiment, a polycarbonate (PC) resin, a polyethylene terephthalate (PET) resin, and a cycloolefin polymer (COP) resin were used. Note that, preliminary experiments were performed for other resins, but more detailed experiments were performed for the above-described three resins from which good results were obtained.

With regard to conformity to the three-dimensional curved surface in the thermoforming, after performing thermoforming in the form of the light control film 10, the state of matching with the three-dimensional curved surface of the first glass plate 33A and the second glass plate 33B was evaluated by visual observation. A case where both shapes almost completely matched was evaluated as "excellent", a case where the both shapes were slightly different was evaluated as "good", a case where the both shapes were different in many parts was evaluated as "acceptable", and a case where the both shapes were clearly different was evaluated as "bad".

TABLE 6

| Base material | Thickness | Stretching | Young's modulus Gpa | TG ° C. | Thermoforming | 3D conformity in thermoforming | Evaluation after completion of laminated glass | |
|---|---|---|---|---|---|---|---|---|
| | | | | | | | Wrinkles | Interlayer air bubble |
| PC | 100 um | not performed | 2.3 | 150 | not performed | — | bad | bad |
| COP | 100 um | not performed | 2.5 | 160 | not performed | — | bad | bad |
| PET | 100 um | not performed | — | 80 | not performed | — | bad | bad |
| PET | 100 um | performed | 4.3 | 80 | not performed | — | bad | bad |
| PC | 100 um | not performed | 2.3 | 150 | performed | good | good | good |
| COP | 100 um | not performed | 2.5 | 160 | performed | good | good | good |
| PET | 100 um | not performed | — | 80 | performed | excellant | excellent | excellent |
| PET | 100 um | performed | 4.3 | 80 | performed | acceptable | acceptable | acceptable |
| PET | 125 um | performed | 4.3 | 80 | performed | bad | bad | bad |
| PET | 50 um | performed | 4.3 | 80 | performed | good | good | good |

With regard to wrinkles after completion of the laminated glass, a case where wrinkle was not found was evaluated as "excellent", a case where one wrinkle was found was evaluated as "good", a case where a plurality wrinkles were found was evaluated as "acceptable", and a case where a conspicuously large wrinkle was found was evaluated as "bad". Note that, here, it is assumed that "bad" is not usable.

With regard to interlayer air bubbles after completion of the laminated glass, a case where air bubble was not found was evaluated as "excellent", a case where one air bubble was found was evaluated as "good", a case where a plurality of air bubbles were found was evaluated as "acceptable", and a case where a conspicuously large air bubble was found was evaluated as "bad". Note that, here, it is assumed that "bad" is not usable.

From the experiment results shown in Table 6, it could be seen that it is preferable the first base material layer 21A and the second base material layer 21B satisfy the following conditions in the laminated glass having the three-dimensional curved surface shape. First, it could be seen that it is necessary to perform the thermoforming even in the case of using any material with regard to the materials used in the experiment. In a condition in which the thermoforming is not performed, wrinkles and interlayer air bubbles occur in any case, and thus this condition is not appropriate for use.

In addition, it is preferable that the first base material layer 21A and the second base material layer 21B are formed in a thickness of 100 μm or less by using any one among a polycarbonate resin (PC), a polyethylene terephthalate resin (PET), and a cycloolefin polymer resin (COP) as a material. Particularly, when the thickness exceeds 100 μm, wrinkles and interlayer air bubbles occur even when performing the thermoforming, and thus this case is not appropriate for use. Note that, from the results in Table 6, it can be seen that the polyethylene terephthalate resin (PET) can also be used as a material of the first base material layer 21A and the second base material layer 21B. However, from results in Table 5 and Table 4, since the polyethylene terephthalate resin (PET) cannot satisfy the condition of the glass transition point Tg, and thus the polyethylene terephthalate resin (PET) is excluded from candidates for the material of the first base material layer 21A and the second base material layer 21B.

In addition, it is preferable that the first base material layer 21A and the second base material layer 21B are formed from a non-stretched material. As can be seen from Table 6, a very satisfactory result is obtained in the non-stretched material even when comparing PETs which are the same material having the same thickness. In the case of non-stretching, it is considered that wrinkles are less likely to occur because an anisotropy is small in an in-plane direction of the first base material layer 21A and the second base material layer 21B.

In addition, it is preferable that the first base material layer 21A and the second base material layer 21B are formed form a material of which Young's modulus (vertical elastic coefficient) is 4.3 GPa or less. In addition, it is preferable that the first base material layer 21A and the second base material layer 21B are formed from a material of which Young's modulus (vertical elastic coefficient) is 2.5 GPa or less. It is considered that the base materials are likely to be flexibly deformed and easy to conform the three-dimensional curved surface shape when the Young's modulus of the first base material layer and the second base material layer is low.

Note that, from results in Table 6, with regard to the glass transition point Tg of the first base material layer 21A and the second base material layer 21B, it can be said that it is preferable that the first base material layer 21A and the second base material layer 21B are formed from a material having Tg of 160° C. or lower, and more preferably a material having Tg of 80° C. or lower. However, from the results in Table 5 and Table 4, the Tg of the first base material layer 21A and the second base material layer 21B is preferably 100° C. or higher, and more preferably 130° C. or higher. Accordingly, a material having Tg of 80° C. or lower is excluded as the material of the first base material layer 21A and the second base material layer 21B because it is not appropriate.

As described above, when selecting the material of the first base material layer 21A and the second base material layer 21B from appropriate material satisfying the above-described conditions, and using the material, it is possible to provide a laminated glass having the three-dimensional curved surface shape in which wrinkles and voids are reduced.

Modification Example

Various modifications and changes can be made without limitation to the above-described embodiment, and it should be understood that the modifications and the changes are included in the scope of the embodiment of the present disclosure.

(1) In the embodiment, description has been given of an example in which the laminated glass 1 has shape protruding toward one side. The three-dimensional curved surface is not limited to the example and it may be various shapes including, for example, a shape in which irregularities are continuous in a wavy manner. In addition, description has been given of an example in which the laminated glass 1 and the light control film 10 have a rectangular shape in plan view, but there is no limitation thereto, and various shapes such as a circular shape, an elliptical shape, a triangular shape, a polygonal shape, and a combination of these shapes in plan view can be employed.

(2) In the embodiment, description has been given of an example in which the autoclave process is performed after performing the preliminary pressing process. For example, the autoclave process may be omitted without limitation to the example in which the autoclave process is performed after performing the preliminary pressing process.

Note that, the embodiment and the modification example can be used in an appropriate combination, but detailed description thereof will be omitted. In addition, the embodiment of the present disclosure is not limited to the above-described embodiment.

EXPLANATION OF REFERENCE NUMERALS

10 LIGHT CONTROL FILM (LIQUID CRYSTAL FILM)
12 FIRST LAMINATED BODY
13 SECOND LAMINATED BODY
14 LIQUID CRYSTAL LAYER
21A FIRST BASE MATERIAL LAYER
21B SECOND BASE MATERIAL LAYER
22A FIRST TRANSPARENT ELECTRODE LAYER
22B SECOND TRANSPARENT ELECTRODE LAYER
23A FIRST ALIGNMENT LAYER
23B SECOND ALIGNMENT LAYER
24 BEAD SPACER
25 SEALING MATERIAL
30 LAMINATED BODY
31A FIRST INTERLAYER FORMING SHEET
31B SECOND INTERLAYER FORMING SHEET
33A FIRST GLASS PLATE

33B SECOND GLASS PLATE
100 EXTERNAL SHAPE OF LAMINATED GLASS (PLAN VIEW)
200 EVALUATION RECTANGLE
300 VACUUM FORMING DEVICE
301 SUCTION STAGE
301a SUCTION HOLE
302 FORMING DIE
303 HOLDING FRAME
304 HEATER
400 HOT PRESS DEVICE
401 LOWER THERMOFORMING DIE
402 UPPER THERMOFORMING DIE
403 HOT PLATE
500 BAG DEVICE
501 BAG
502 FORMING DIE
503 OVEN

The invention claimed is:

1. A method for manufacturing laminated glass obtained by joining a laminated body in which a first glass plate and a second glass plate which have a three-dimensional curved surface shape sandwich a liquid crystal film, the liquid crystal film including a first base material layer, a first transparent electrode layer, a liquid crystal layer, a second transparent electrode layer, and a second base material layer in this order in a thickness direction, the method comprising:

a thermoforming process of heating the liquid crystal film to a temperature equal to or higher than a glass transition point of the first base material layer and the second base material layer to form a three-dimensional curved surface shape of the laminated glass in the liquid crystal film; and a joining process of heating the laminated body in which the first glass plate and the second glass plate sandwich a liquid crystal film at a temperature lower than a glass transition point of the first base material layer and the second base material layer after performing the thermoforming process, and pressing the laminated body at a predetermined pressure for joining.

2. The method for manufacturing laminated glass according to claim 1, wherein:

an arbitrary rectangle that is inscribed in an external shape of the laminated glass in plan view at three or more points is set, and a greater one between a variation amount of a first dimension in the rectangle along a surface shape of the laminated glass in a direction parallel to one side of the rectangle in plan view and a variation amount of a second dimension in the rectangle along the surface shape of the laminated glass in a direction parallel to another side of the rectangle in plan view is set as a curvature evaluation value of the rectangle, and in the laminated glass, one or more rectangles have a curvature evaluation value of 0.0003 mm or greater.

3. The method for manufacturing laminated glass according to claim 1, wherein in the thermoforming process, the liquid crystal film is heated to a temperature equal to or higher than the glass transition point of the first base material layer and the second base material layer, and is cooled down to a temperature lower than the glass transition point in a state in which the liquid crystal film is pressed to come into close contact with a forming die.

4. The method for manufacturing laminated glass according to claim 1, wherein the glass transition point of the first base material layer and the second base material layer is 100° C. or higher.

5. The method for manufacturing laminated glass according to claim 1, wherein the glass transition point of the first base material layer and the second base material layer is 130° C. or higher.

* * * * *